US008403118B2

(12) United States Patent
Swank et al.

(10) Patent No.: US 8,403,118 B2
(45) Date of Patent: Mar. 26, 2013

(54) THREE-PASS TURBINE DAMPER

(75) Inventors: Michael G. Swank, Wooster, OH (US); Steven Olsen, Wooster, OH (US); Jonathan Jameson, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1060 days.

(21) Appl. No.: 11/820,378

(22) Filed: Jun. 19, 2007

(65) Prior Publication Data
US 2008/0000745 A1    Jan. 3, 2008

Related U.S. Application Data

(60) Provisional application No. 60/816,932, filed on Jun. 28, 2006.

(51) Int. Cl.
*F16H 45/02* (2006.01)
(52) U.S. Cl. ...................................... 192/3.3; 192/113.34
(58) Field of Classification Search .................. 192/3.29, 192/3.3, 55.61, 113.34
See application file for complete search history.

(56) References Cited

U.S. PATENT DOCUMENTS

| | | | | |
|---|---|---|---|---|
| 5,695,028 A * | 12/1997 | Fukushima | ................. | 192/3.27 |
| 5,964,329 A * | 10/1999 | Kawaguchi et al. | ........... | 192/3.3 |
| 6,343,679 B1 * | 2/2002 | Kundermann | .................. | 192/3.3 |
| 6,814,202 B1 * | 11/2004 | Johann et al. | .................. | 192/45 |
| 8,151,957 B2 * | 4/2012 | Hoffmann et al. | ............ | 192/3.3 |
| 8,225,916 B2 * | 7/2012 | Liang et al. | ................... | 192/3.29 |
| 2002/0125093 A1 | 9/2002 | Maienschein et al. | | |
| 2003/0010588 A1 * | 1/2003 | Maienschein et al. | ....... | 192/3.29 |
| 2005/0056512 A1 * | 3/2005 | Sasse et al. | ..................... | 192/3.3 |
| 2006/0207851 A1 * | 9/2006 | Heuler et al. | .................. | 192/3.3 |
| 2007/0251788 A1 * | 11/2007 | Heck et al. | ...................... | 192/3.3 |
| 2008/0277222 A1 * | 11/2008 | Olsen et al. | .................. | 192/3.21 |
| 2008/0277223 A1 * | 11/2008 | Liang et al. | ................... | 192/3.21 |
| 2008/0277227 A1 * | 11/2008 | Jameson et al. | ............. | 192/3.33 |

FOREIGN PATENT DOCUMENTS

| | | |
|---|---|---|
| DE | 10117746 | 11/2001 |
| JP | 58131464 | 8/1983 |
| JP | 2000088080 | 3/2000 |

* cited by examiner

*Primary Examiner* — David D Le
*Assistant Examiner* — Terry Chau
(74) *Attorney, Agent, or Firm* — Simpson & Simpson, PLLC

(57) ABSTRACT

A torque converter, including: turbine and pump shells; a turbine hub; a drive hub including a first orifice; and a lock-up clutch. The clutch includes: a clutch plate directly engaged with the turbine hub, fixed with respect to rotation to the turbine hub, and sealed with respect to the turbine hub; an apply plate the rotation of which is fixed to the rotation of the pump shell; and a piston plate. The converter includes a first fluid chamber at least partially formed by the piston, clutch and apply plates; and a second fluid chamber partially formed by the clutch and apply plates and the turbine and pump shells. When the lock-up clutch is closed, the first chamber is sealed except for the first orifice and one of a second orifice through the apply plate or a first fluid flow path through the lock-up clutch to the second fluid chamber.

5 Claims, 9 Drawing Sheets

PRIOR ART

PRIOR ART

THREE-PASS TURBINE DAMPER

CROSS REFERENCE TO RELATED APPLICATIONS

This patent application claims the benefit under 35 U.S.C. §119(e) of U.S. Provisional Application No. 60/816,932, filed Jun. 28, 2006, which application is incorporated herein by reference.

FIELD OF THE INVENTION

The invention relates generally to torque converters and, more specifically, to a three-pass turbine damper for a torque converter.

BACKGROUND OF THE INVENTION

It is well known that a torque converter is used to transmit torque from an engine to a transmission of a motor vehicle. FIG. 1 illustrates a general block diagram showing the relationship of the engine 7, torque converter 10, transmission 8, and differential/axle assembly 9 in a typical vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At high speed ratios, the torque converter is less efficient. The torque ratio of the torque converter gradually reduces from a high of about 1.8 to 2.2, to a torque ratio of about 1 as the turbine rotational speed approaches the pump rotational speed. Torque ratio of 1 is called the coupling point. At this point, the fluid entering the stator no longer needs to be redirected, and the one-way clutch in the stator allows it to rotate in the same direction as the pump and turbine. Because the stator is not redirecting the fluid, torque output from the torque converter is the same as torque input. The entire fluid circuit will rotate as a unit.

Maximum torque converter efficiency is limited to 92-93% based on losses in the fluid. Therefore torque converter clutch 49 is employed to mechanically connect the torque converter input to the output, improving efficiency to near 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

There is a long-felt need for a torque converter having a flow chamber. There is also a long-felt need for a method for accurately controlling fluid flow in a torque converter.

BRIEF SUMMARY OF THE INVENTION

The present invention broadly comprises a torque converter, including: turbine and pump shells; a turbine hub; a drive hub including a first orifice; and a lock-up clutch. The clutch includes: a clutch plate rotationally fixed to the turbine hub and sealed to the turbine hub; an apply plate at least indirectly connected to the pump shell so that the rotation of the apply plate is fixed to the rotation of the pump shell; and a piston plate. The converter includes a first fluid chamber at least partially formed by the piston plate, the clutch plate, and the apply plate; and a second fluid chamber at least partially formed by the clutch plate, the turbine shell, the pump shell, and the apply plate. When the lock-up clutch is closed, the first chamber is sealed with the exception of the first orifice and one of a second orifice through the apply plate or a first fluid flow path through the lock-up clutch to the second fluid chamber.

The invention also includes a method of converting torque in a motor vehicle comprising the steps of driving a torque converter housing via an engine, transferring fluid to a turbine within the torque converter, rotating the transmission input shaft via the turbine fluid transfer, transferring engine torque via a mechanical lock-up mechanism, controlling the lock-up mechanism fluid flow via a flow chamber, and releasing the flow chamber fluid via an orifice.

It is a general object of the present invention to provide a torque converter having a flow chamber, bounded by a piston plate and a clutch plate.

It is another object of the present invention to provide a method for controlling fluid flow in a torque converter.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
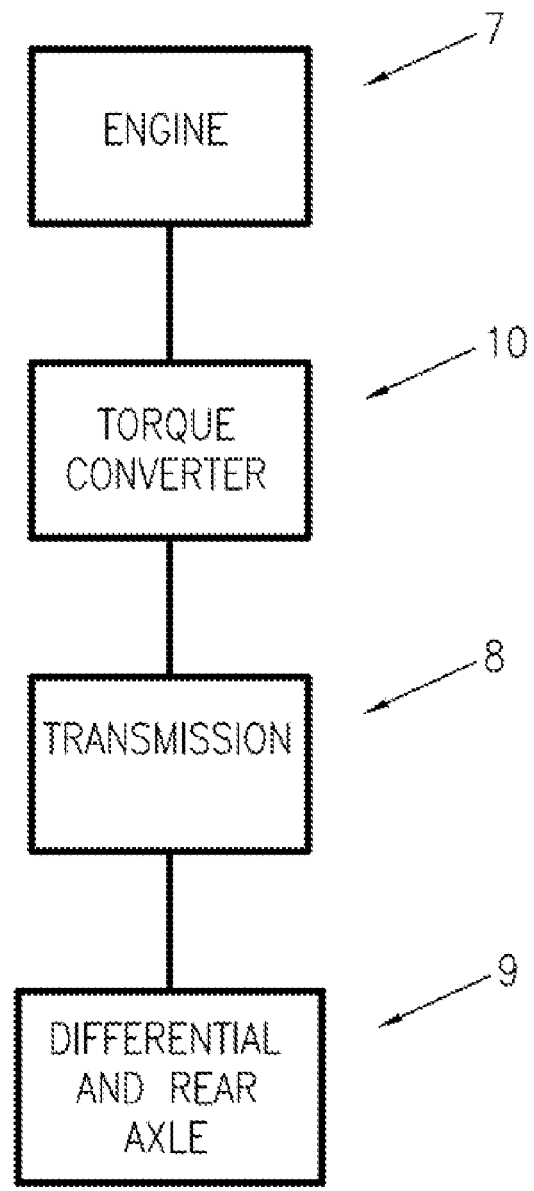
FIG. 1 is a general block diagram illustration of power flow in a motor vehicle, intended to help explain the relationship and function of a torque converter in the drive train thereof.
Figure 2:
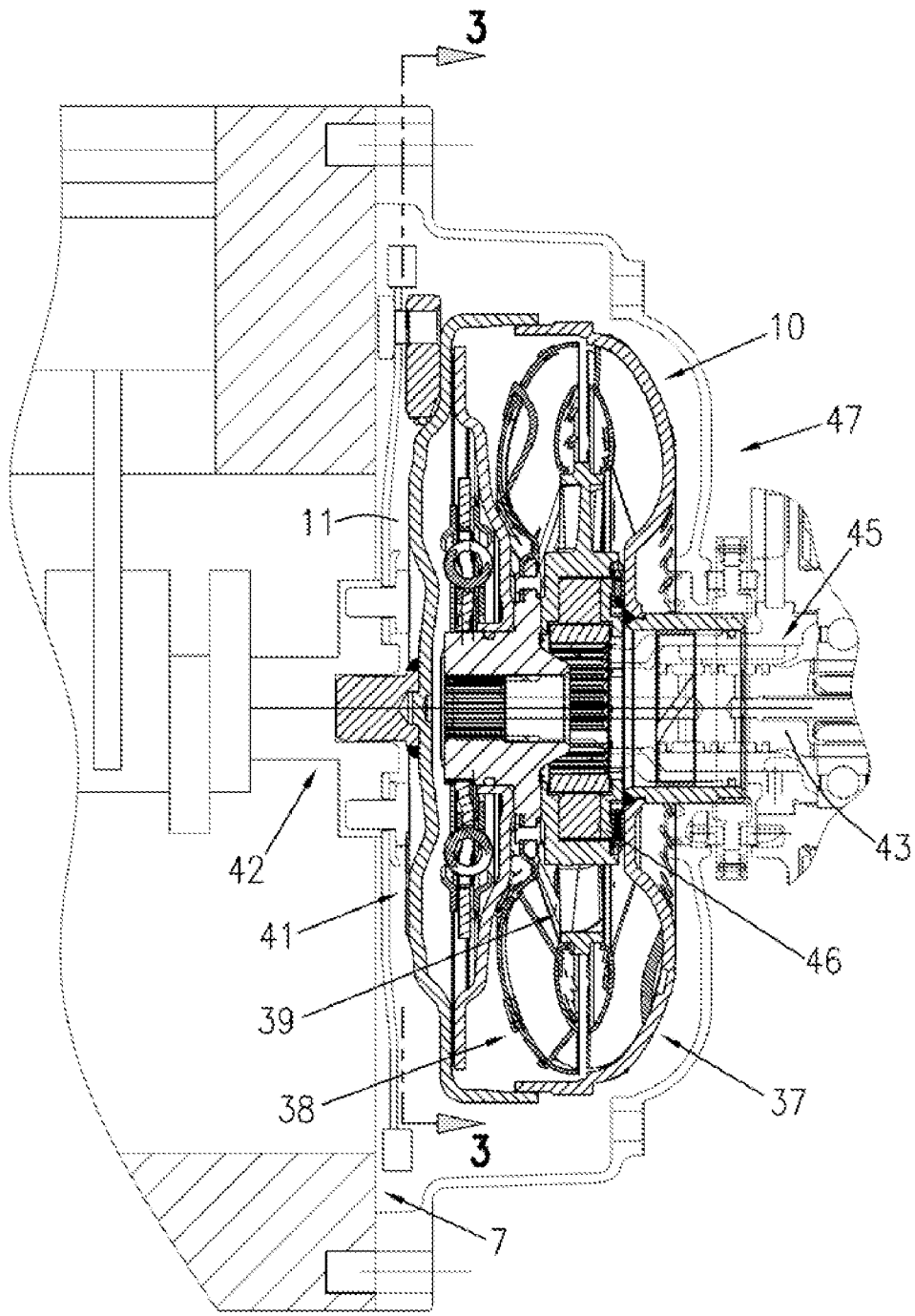
FIG. 2 is a cross-sectional view of a prior art torque converter, shown secured to an engine of a motor vehicle.
Figure 3:
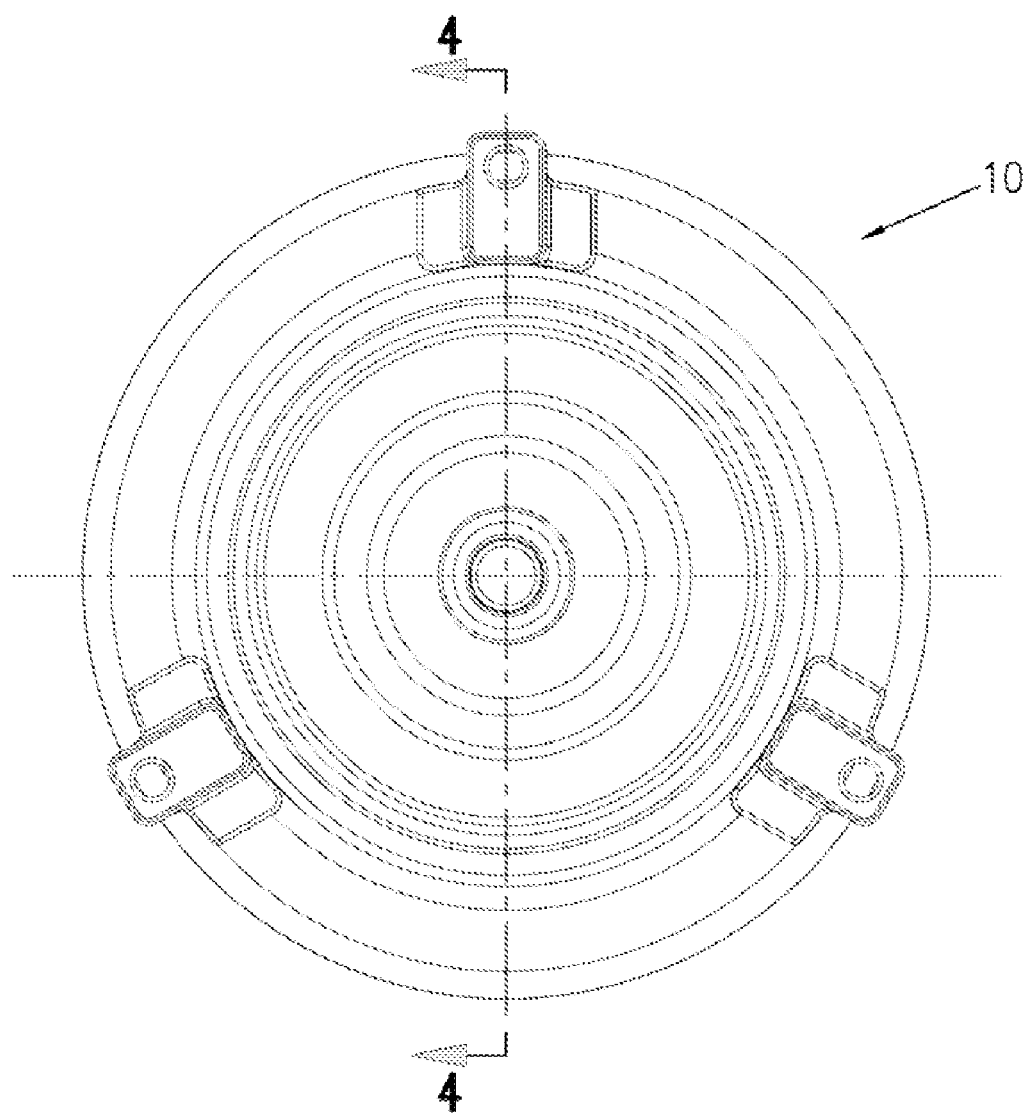
FIG. 3 is a left view of the torque converter shown in FIG. 2, taken generally along line 3-3 in FIG. 2.
Figure 4:
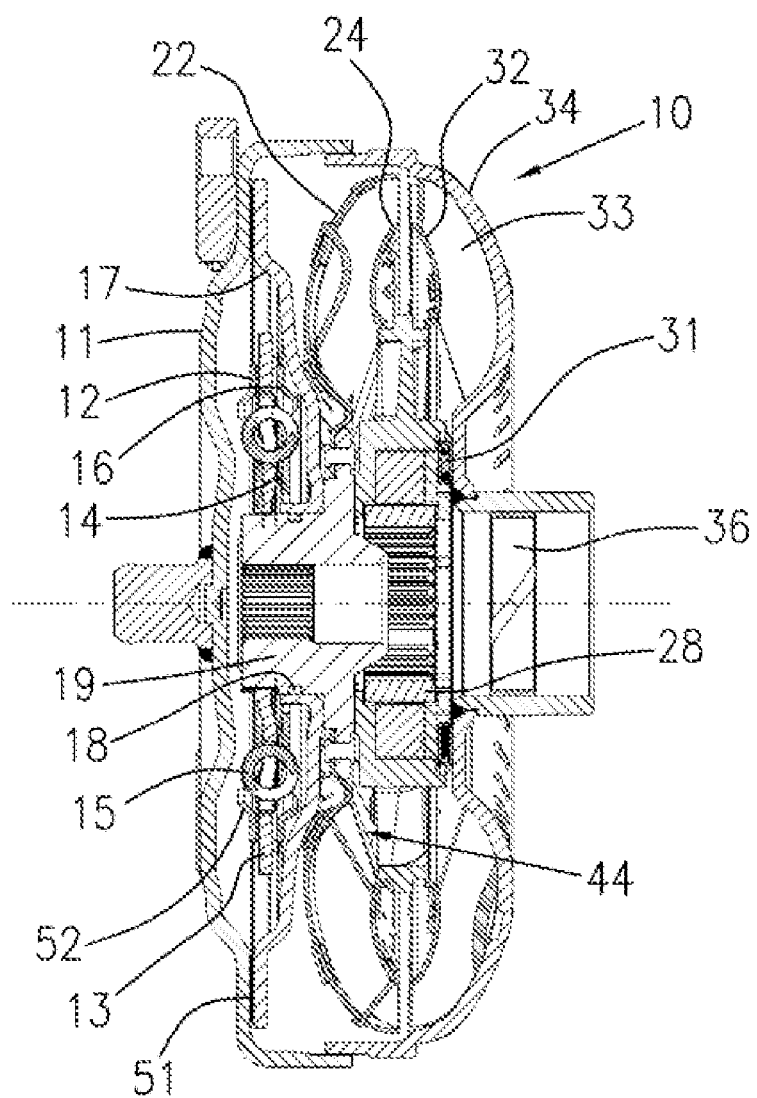
FIG. 4 is a cross-sectional view of the torque converter shown in FIGS. 2 and 3, taken generally along line 4-4 in FIG. 3.
Figure 5:
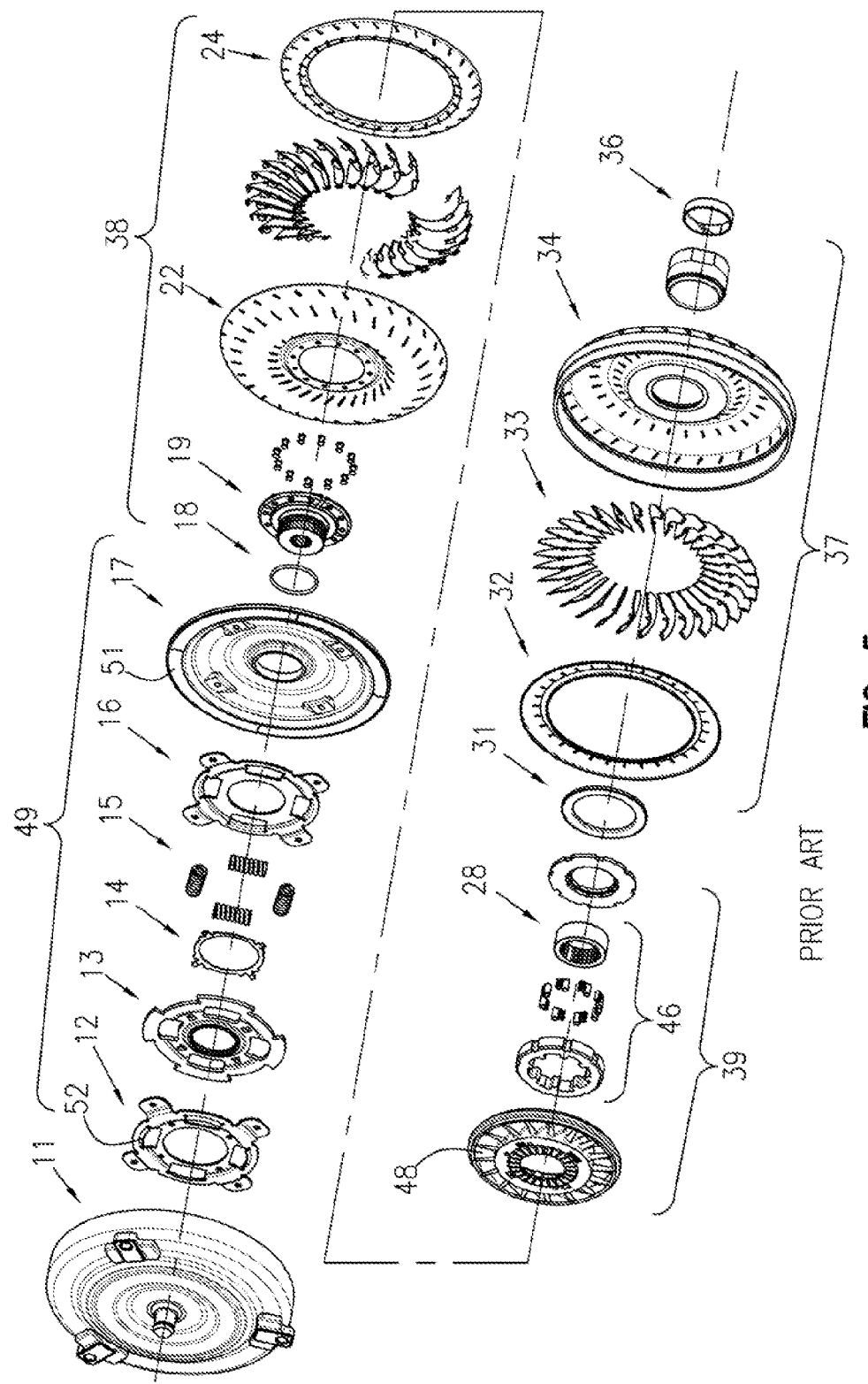
FIG. 5 is a first exploded view of the torque converter shown in FIG. 2, as shown from the perspective of one viewing the exploded torque converter from the left; and, FIG. 6 is a second exploded view of the torque converter shown in FIG. 2, as shown from the perspective of one viewing the exploded torque converter from the right.
Figure 6:
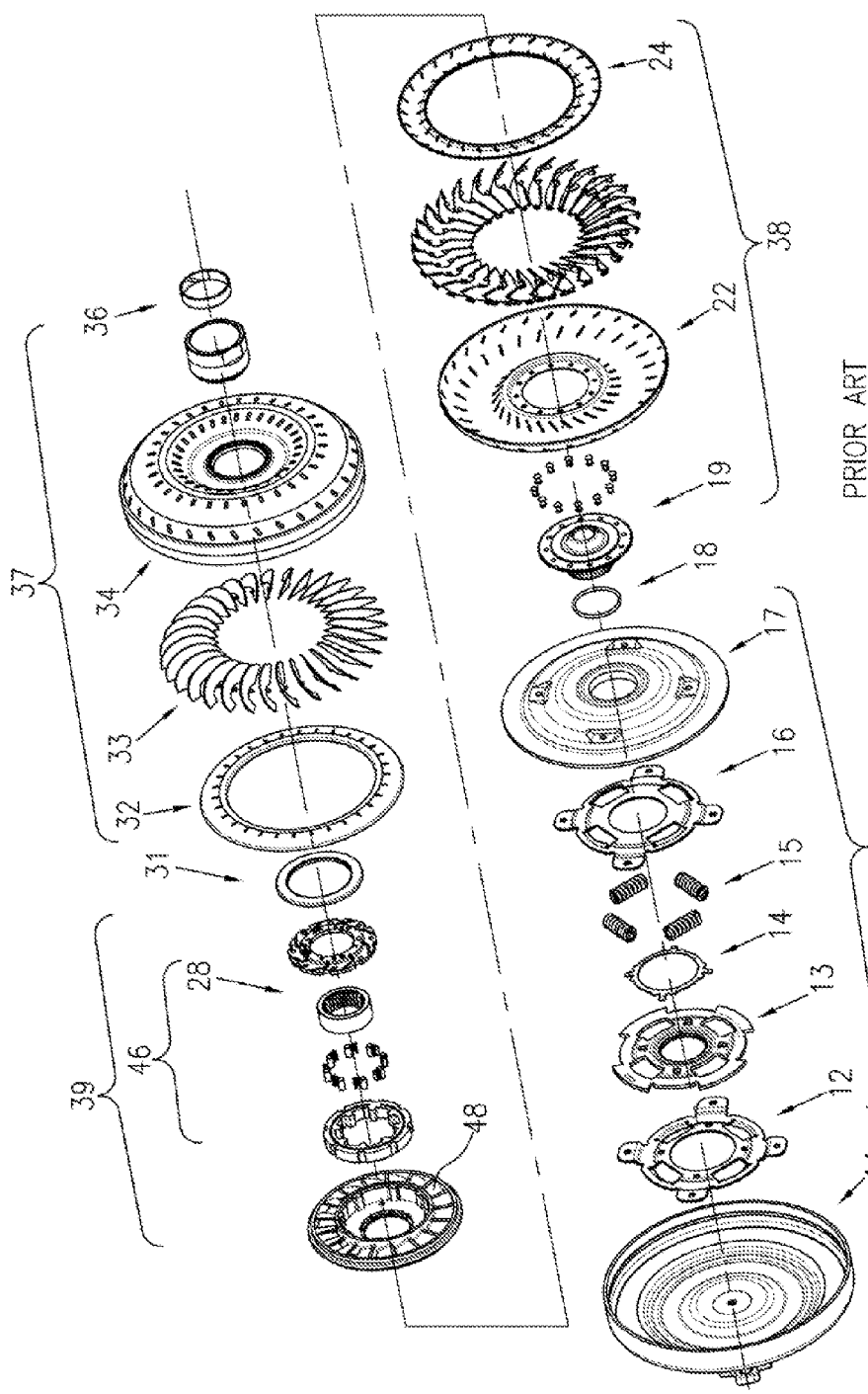
Figure 7:
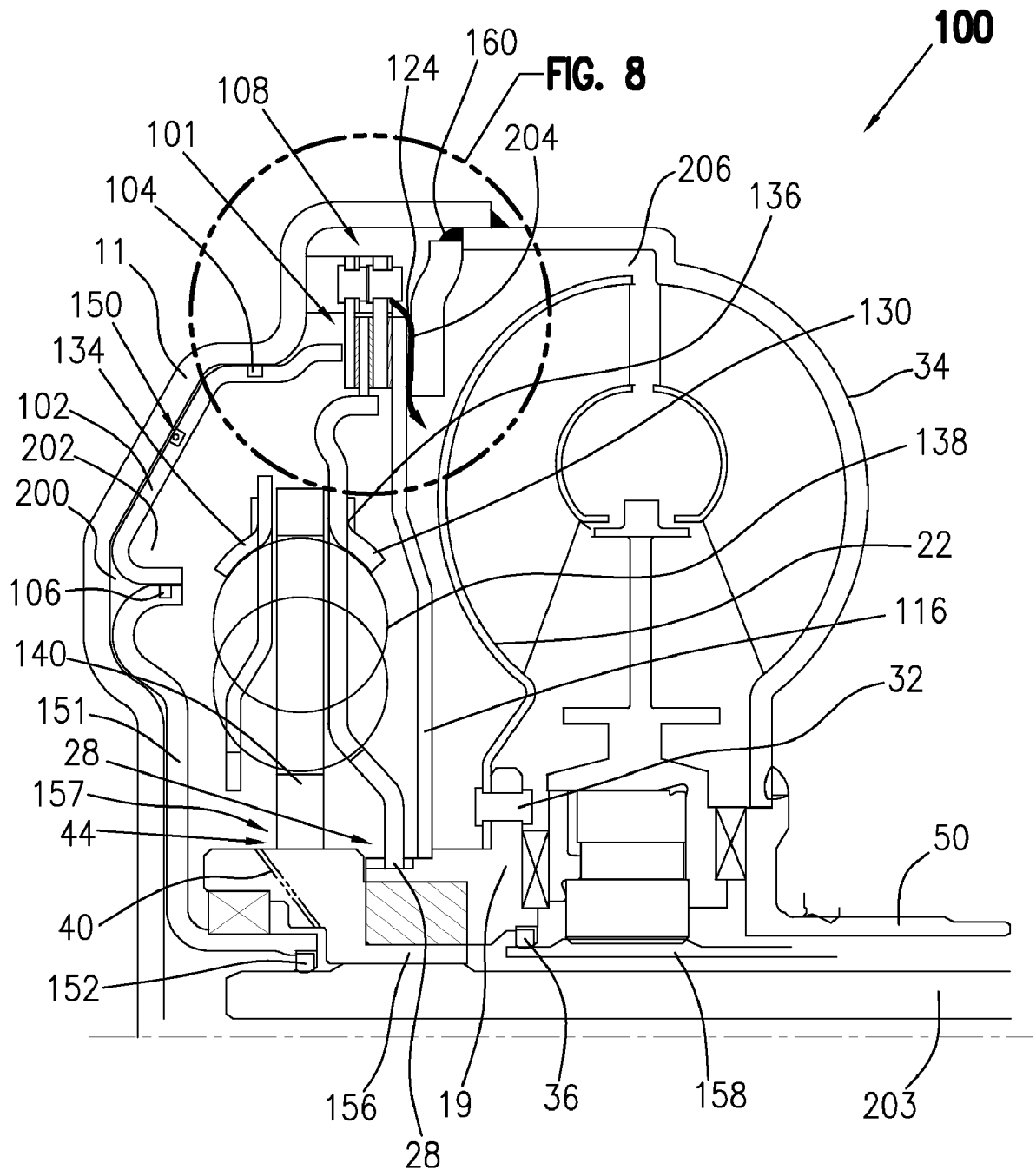
FIG. 7 is a cross-sectional view of the torque converter assembly of the invention.

FIG. 7 is a cross-sectional view of torque converter 10. Torque converter 10 comprises torque converter clutch 49. Torque converter clutch 49 comprises clutch piston plate 17. Seal 104 is arranged to create a fluid-tight seal between clutch piston plate 17 and cover 11. Seal 106 is arranged to create a fluid-tight seal between clutch piston plate 17 and sealing member 153. Anti-rotation means (not shown) non-rotatably connects clutch piston plate 17 and cover 11, preventing wear of seals 104 and 106 caused by rotation of clutch piston plate 17 in cover 11. In some aspects, anti-rotation means comprises a protrusion on cover 11 and a receiving indent in clutch piston plate 102. Sealing member 151 is further sealed to input shaft 203 by seal 152. Cover 11, sealing member 151 and clutch piston plate 17, together with seals 152, 104, and 106, comprise an outer periphery of pressure chamber 200. Torque converter 10 also includes pump shell 34.

Figure 8:
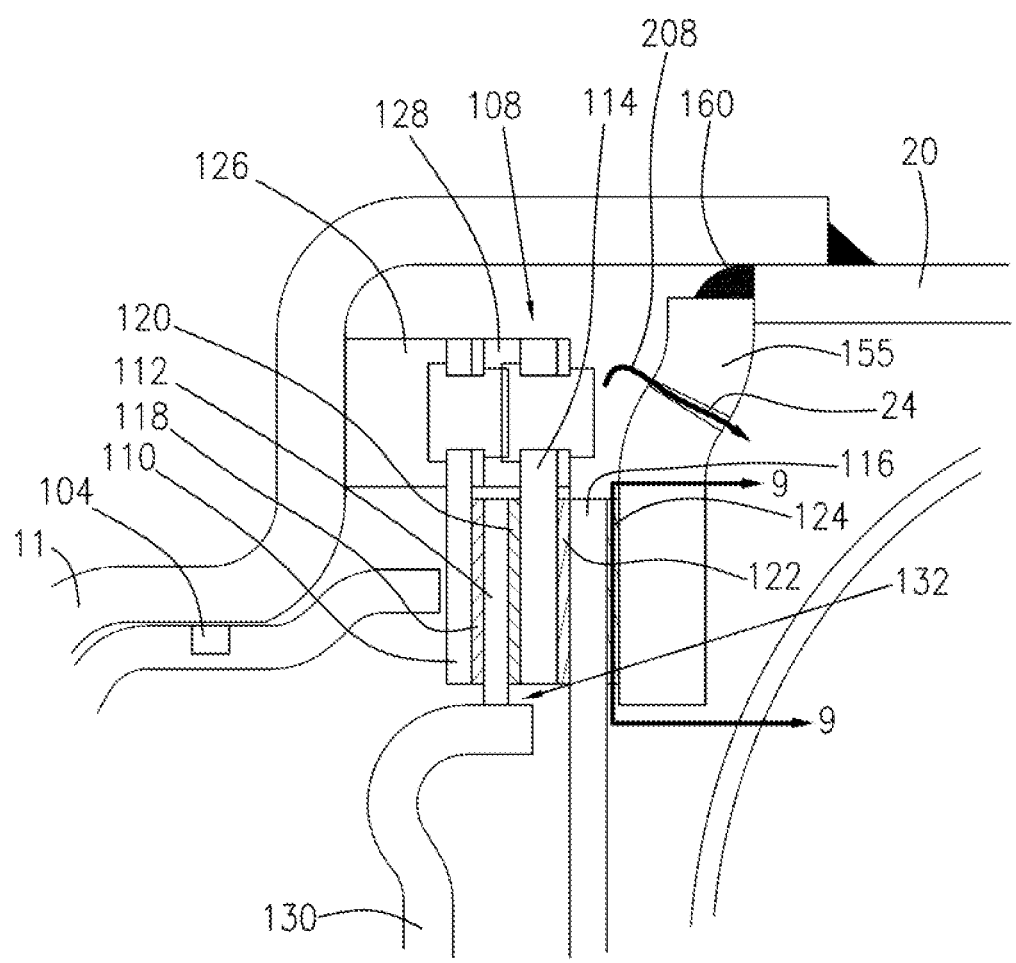
FIG. 8 is an enlarged view of the encircled region shown in FIG. 7; and, FIG. 9 is a cross-sectional view of a friction material ring shown in FIG. 7, taken generally along line 9-9 in FIG. 8.

FIG. 8 is a detail of the encircled region labeled "FIG. 8" in FIG. 7. Torque converter clutch 101 further comprises clutch pack 108. Clutch pack 108 is comprised of a plurality of clutch plates 110, 112, 114, and 116, and friction material rings 118, 120, 122, and 124. In some aspects, friction material ring 118 is bonded to friction clutch plate 110, friction material ring 120 is bonded to clutch plate 112, friction material ring 122 is bonded to clutch plate 114, and friction material ring 124 is bonded to clutch plate 116. Clutch plate 110 is rotationally connected to cover 11 via leaf spring 126. Clutch plate 114 is rotationally connected to cover 11 via leaf spring 128. Clutch plate 112 is driveably engaged with cover plate 130 via spline portion 132. Apply plate 155 is fixedly connected to pump housing 20 via weld 160. Apply plate 155 comprises flow orifice 24.

Returning to FIG. 7, clutch plate 116 is driveably engaged with turbine hub 19 by engagement with spline portion 28. Turbine hub 19 is fixedly connected to turbine shell 22 by rivet 32. A fluid-tight seal is formed between clutch plate 116 and turbine hub 19 by welding or adhesive. Seal 36 is arranged to create a fluid-tight seal between turbine hub 19 and stator shaft 158. Drive hub 156 comprises orifice 40. Clutch piston plate 102, cover 11, apply plate 155, friction material ring 124, clutch plate 116, turbine hub 19, drive hub 156, sealing member 151, seals 152, 36, 104, and 106, and weld 160 comprise an outer periphery of flow chamber 202.

Cover plate 130 is driveably engaged with turbine hub 19 by engagement with spline portion 28. Cover plate 130 is fixedly connected to cover plate 134 by rivet 136. Together, edges of window cutouts in cover plates 130 and 134 engage a first end of coil spring 138. Coil spring 138, in turn, engages edge of window cutout in flange 140. Flange 140 is driveably engaged with drive hub 156 through spline portion 157. Drive hub 156 is driveably engaged with input shaft 203 through spline portion 157. Overload spline (not shown) driveably engages turbine hub 19 and drive hub 156 after a predetermined amount of rotational displacement by cover plate 130 relative to flange 140.

During operation in torque converter mode, clutch pack 108 is not engaged. Therefore, torque received by cover 11 is transferred to pump housing 20 through weld 160. Pump torque received by turbine shell 30 is imparted on turbine hub 19 through rivet 32. Spline 28 transmits torque to cover plate 130 which is in turn shared with cover plate 134 by riveted connection 136. Cover plates 130 and 134 compress spring 138 against flange 140. Flange outputs damper torque to drive hub 156 through spline connection 157. When rotational displacement exceeds the predetermined amount, overload spline (not shown) directly engages turbine hub 19 and drive hub 156, advantageously preventing excessive turbine torque from passing through coil springs 138. Therefore, cover plates 130 and 134, and flange 140 need only be sized for engine torque rather than multiplied turbine torque.

When torque converter clutch mode is commanded, pressurized oil enters pressure chamber 200 through input shaft (not shown). Pressurized oil in pressure chamber 200 forces clutch piston plate 102 towards pump 34, thereby compressing clutch pack 108. Torque received by cover 11 is transferred to clutch plates 110 and 114 by leaf springs 126 and 128, respectively, and apply plate 155 through weld 160. Compression of friction material rings 118, 120, 122, and 124 transfers torque to clutch plates 112 and 116. Clutch plate 112 transfers a portion of torque to cover plate 130 through spline connection 132. Clutch plate 116 transfers a remaining portion of torque to cover plate 130 through spline portion 28 in turbine hub 19. Therefore, plates 116 and 130 are tightly engaged with spline portion 28, advantageously eliminating the possibility of rattle caused by spline lash.

Figure 9:
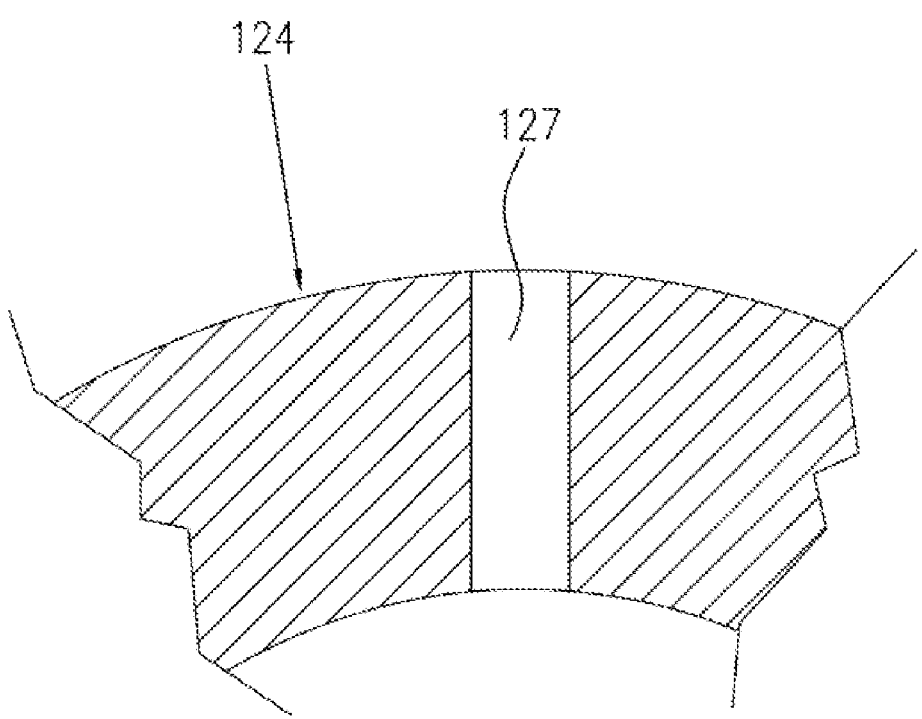

FIG. 9 is a cross-sectional view of friction material ring 124 shown in FIG. 7, taken generally along line 9-9 in FIG. 8. A three-pass apply system allows cooling of clutch pack 108 while maintaining a controlled pressure in pressure chamber 200. Cooling flow enters flow chamber 202 through orifice 40 from gap between input shaft 203 and stator shaft 158. Oil is forced radially outward through friction material rings 118, 120, and 122. In some aspects, friction material rings are grooved to allow oil flow, for example, as shown in FIG. 9, friction material ring 124 includes at least one groove 127. Flow path 204 passes through grooves 127 to flow chamber 206 formed at least partially by clutch plate 116, apply plate 155, and the pump shell. Flow path 208 passes through orifice 24 to flow chamber 206. Thus, cooling oil passes through rings 118, 120, and 122, the cooling oil exits flow chamber 202 through orifice 24 in apply plate 155 (flow path 206) or through grooves 127 in friction material ring 124 (flow path 204) to flow chamber 204. Oil exits torque converter flow chamber 204 through the gap between stator shaft 158 and pump hub 50.

Thus, it is seen that the objects of the present invention are efficiently obtained, although modification and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

| PARTS LIST | |
|---|---|
| 7 | engine |
| 8 | transmission |
| 9 | differential/axial assembly |
| 10 | torque converter |
| 11 | cover |
| 12 | cover plates |
| 13 | flange |
| 14 | diaphragm spring |
| 15 | springs |
| 16 | cover plates |
| 17 | clutch piston plate |
| 18 | o-ring |
| 19 | turbine hub |
| 22 | turbine shell |
| 24 | orifice |
| 28 | spline portion |
| 30 | turbine shell |
| 31 | axial thrust bearings |
| 32 | rivet |
| 34 | pump housing |
| 36 | turbine hub seal |
| 37 | pump |
| 38 | turbine |
| 39 | stator |
| 40 | orifice |
| 41 | flexplate |
| 42 | crankshaft |
| 43 | transmission input shaft |
| 44 | turbine outlet |
| 45 | stator shaft |
| 46 | one-way clutch |
| 47 | transmission housing |
| 48 | stator blades |
| 49 | torque converter clutch |
| 50 | pump hub |
| 51 | friction material ring |
| 52 | friction material ring |
| 104 | od seal |
| 106 | id seal |
| 108 | clutch pack |
| 110 | clutch plate |
| 112 | clutch plate |
| 114 | clutch plate |
| 116 | clutch plate |
| 118 | friction material ring |
| 120 | friction material ring |
| 122 | friction material ring |
| 124 | friction material ring |
| 126 | leaf spring |
| 128 | leaf spring |
| 130 | cover plate |
| 132 | spline portion |
| 134 | cover plate |
| 136 | rivet |
| 138 | coil spring |
| 140 | flange |
| 152 | id seal |
| 153 | sealing member |
| 155 | apply plate |
| 156 | drive hub |
| 157 | spline |
| 158 | stator shaft |
| 160 | weld |
| 200 | pressure chamber |
| 202 | flow chamber |
| 203 | input shaft |

What is claimed is:

1. A torque converter, comprising:
a turbine shell;
a pump shell;
a turbine hub;
a drive hub for connecting to an input shaft;
a first orifice through the drive hub;
a damper including a cover plate for accepting torque input to the damper;

a lock-up clutch including:
- a first clutch plate directly engaged with the turbine hub fixed with respect to rotation to the turbine hub, and sealed with respect to the turbine hub;
- an apply plate at least indirectly connected to the pump shell so that the rotation of the apply plate is fixed to the rotation of the pump shell;
- a second clutch plate directly connected to the cover plate so that the rotation of the cover plate is fixed to the rotation of the second clutch plate; and,
- a piston plate;

a first fluid chamber at least partially formed by the piston plate, the first clutch plate, and the apply plate; and, a second fluid chamber at least partially formed by the first clutch plate, the turbine shell, the pump shell, and the apply plate, wherein when the lock-up clutch is closed, the first chamber is sealed with the exception of:
- the first orifice; and,
- a first fluid flow path through a second orifice through the apply plate; or, a second fluid flow path through the lock-up clutch to the second fluid chamber.

2. The torque converter of claim 1, wherein:
the lock-up clutch includes friction material with at least one groove; and,
the first fluid flow path includes the at least one groove.

3. The torque converter of claim 1, wherein:
the lock-up clutch includes friction material disposed between the clutch plate and the apply plate, the friction material including at least one groove; and,
the first fluid flow path includes the at least one groove.

4. The torque converter of claim 1, further comprising:
a cover for receiving torque from an engine or motor;
a sealing plate sealingly engaged with the piston plate; and,
a third fluid chamber at least partly formed by the cover, the sealing plate, and the piston, wherein the third chamber is sealed with the exception of a space between the cover and the sealing plate.

5. The torque converter of claim 1, wherein: the cover plate has a first spline or tooth portion;
the turbine hub includes a second spline or tooth portion engaged with the first spline or tooth portion; and,
when the lock-up clutch is closed, the clutch plate urges the turbine hub in a rotational direction such that the first and second spline or tooth portions are fixed with respect to one another in the rotational direction.

* * * * *